United States Patent [19]
Ueno et al.

[11] 3,945,019
[45] Mar. 16, 1976

[54] APPARATUS AND METHOD FOR RECORDING CHARACTERS SO AS TO ENABLE READING THEREOF IN A FEED DIRECTION OF A RECORDING SHEET THEREFOR

[75] Inventors: Masaaki Ueno, Chiba; Takehiro Ono, Funabashi, both of Japan

[73] Assignee: Kabushiki Kaisha Seikosha, Japan

[22] Filed: Mar. 5, 1974

[21] Appl. No.: 448,185

[30] Foreign Application Priority Data
Mar. 31, 1973  Japan................... 48-36181

[52] U.S. Cl. ...... 346/74 ES; 340/172.5; 346/74 EH; 346/74 EE
[51] Int. Cl.² ................. G01D 15/06; G03G 5/054
[58] Field of Search ......... 346/74 E, 74 CH, 74 ES, 346/74 S, 74 SB, 74 EE, 74 EH; 360/51, 52, 13; 340/172.5

[56] References Cited
UNITED STATES PATENTS

| | | | |
|---|---|---|---|
| 3,518,699 | 6/1970 | Mitchell | 346/74 ES |
| 3,548,382 | 12/1970 | Lichty | 340/172.5 |
| 3,702,996 | 11/1972 | Wolfer | 360/51 |
| 3,769,628 | 10/1973 | Kenny | 346/74 ES |
| 3,810,235 | 5/1974 | Hopkins | 360/51 |

*Primary Examiner*—Bernard Konick
*Assistant Examiner*—Jay P. Lucas
*Attorney, Agent, or Firm*—Robert E. Burns; Emmanuel J. Lobato; Bruce L. Adams

[57] ABSTRACT

A data recording system wherein output data from an electronic computer or the like to a display are re-edited in conformity with a predetermined recording system, and information is recorded in patterns of discrete dots developed by dot-forming means and in the feed direction of a recording paper therefor.

2 Claims, 22 Drawing Figures

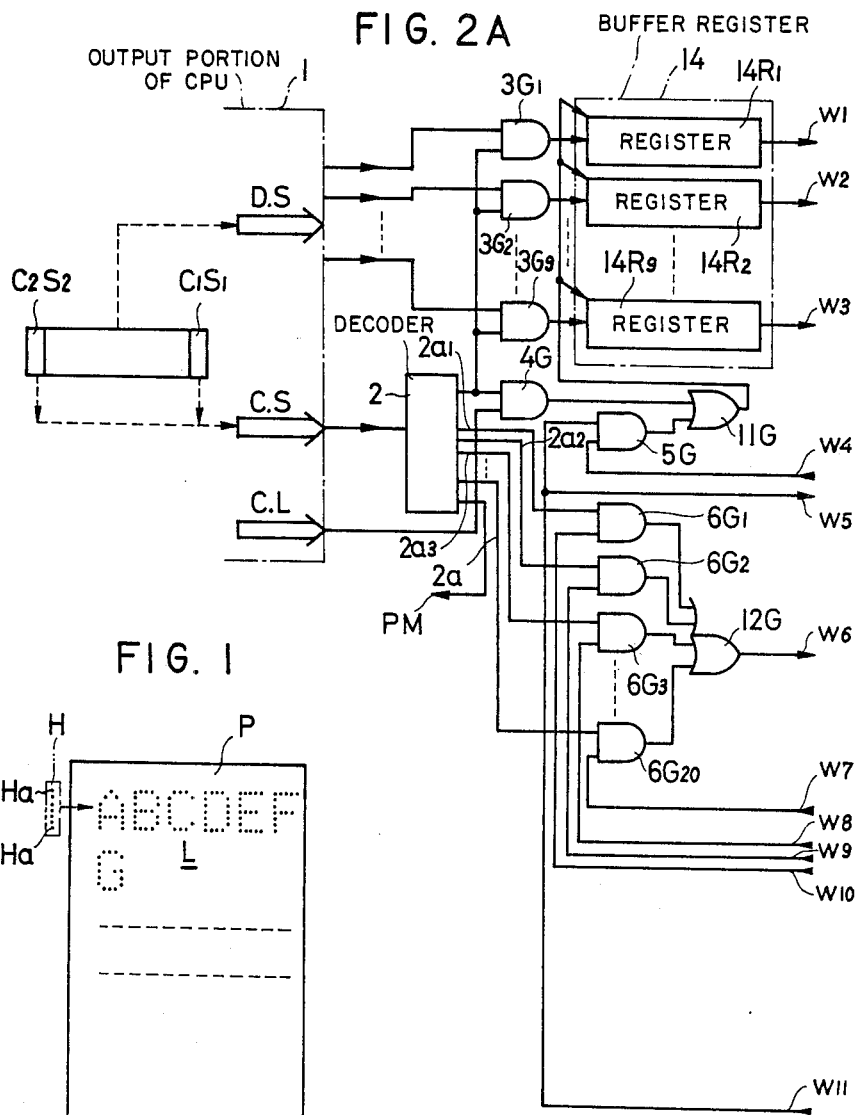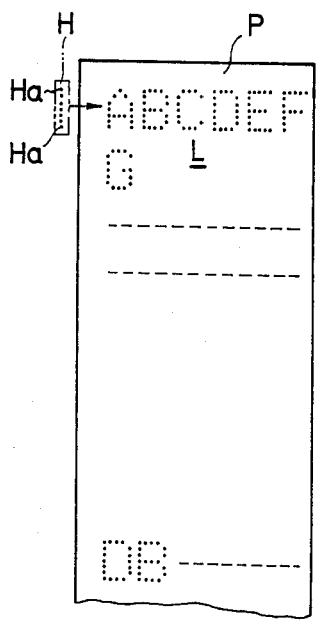

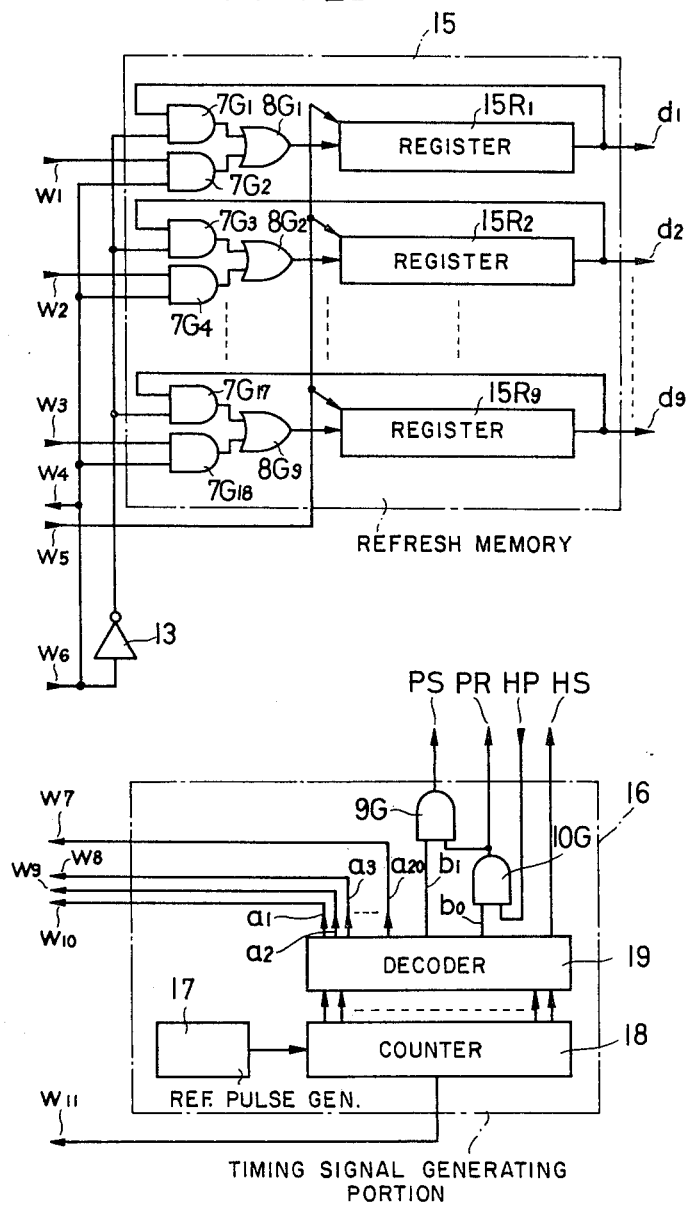

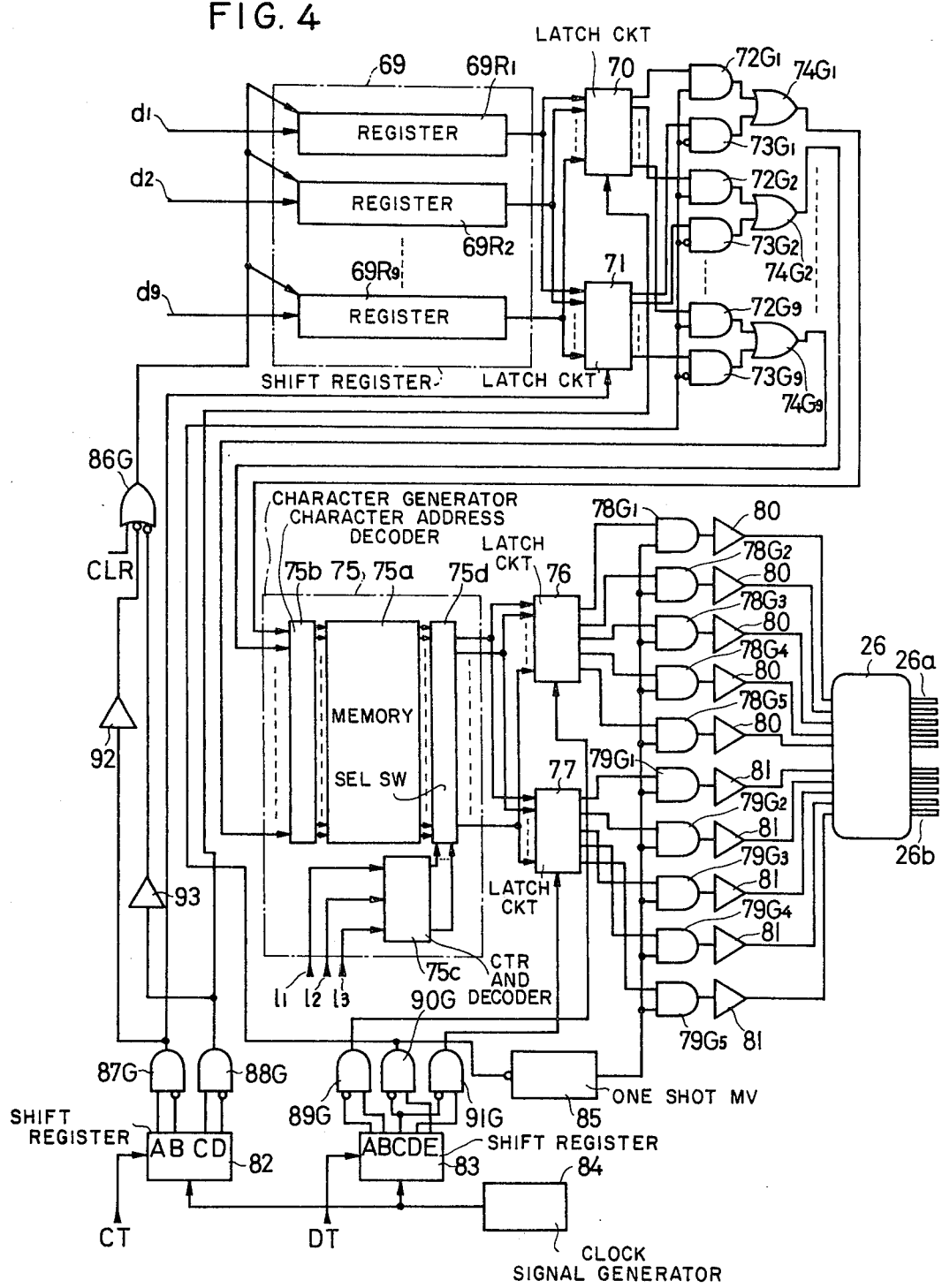

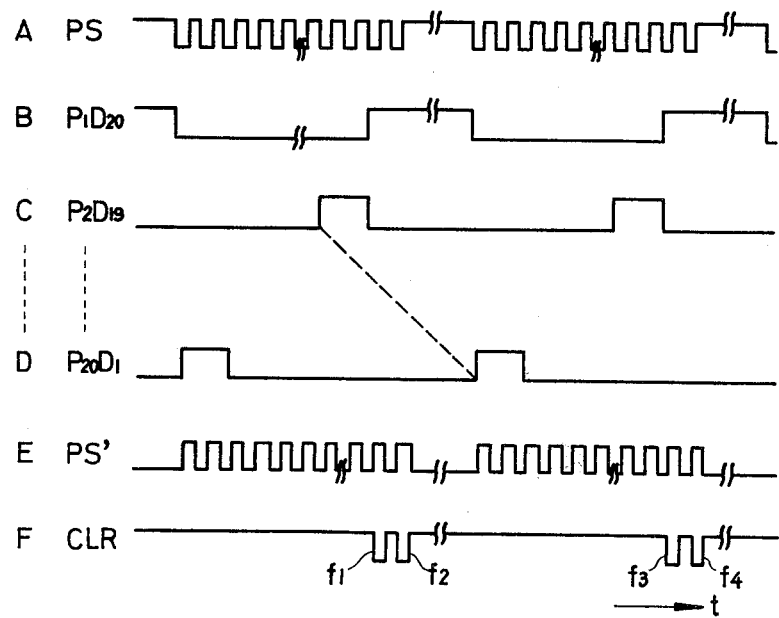

APPARATUS AND METHOD FOR RECORDING CHARACTERS SO AS TO ENABLE READING THEREOF IN A FEED DIRECTION OF A RECORDING SHEET THEREFOR

BACKGROUND OF THE INVENTION

The present invention relates to a data recording system in which information to be displayed on a CRT display or the like are re-edited, and information is recorded in the feed direction of recording paper by the use of the edited data.

As a system of this type, there has hitherto been the electrosensitive recording system as shown in FIG. 1. Depicted in the figure is an example in which each character is recorded in the form of a pattern of $5 \times 7$ dots, and which has been constructed and operated such that a head H with seven pin electrodes Ha planted in opposition to recording paper P is moved in the transverse direction, while the pin electrodes are caused to effect discharge selectively in correspondence with recording data, thereby to successively record the dot characters L. The system, however, has had the disadvantage that when the number of digits in the recording increase, a series of information recording is divided into a number of rows and is therefore difficult to read in case of narrow recording paper.

In case of reproducing the displaying contents of the CRT display, the prior art has recorded the picture of a display screen through the medium of an optical system, and hence, the mechanism has been extremely complicated. On account of the reproduction of the picture itself, the recording has been restricted in the size of copying paper.

SUMMARY OF THE INVENTION

It is accordingly the first object of the present invention to provide a data recording system in which circuits for editing information in conformity with a predetermined recording system are simple in arrangement, and all the circuits can be put into an integrated circuit, so that the apparatus can be made small in size.

The second object of the present invention is to provide a data recording system in which as a recording head is scanning orthogonally to the feed direction of the recording paper, characters; numerals; symbols etc. are recorded in the feed direction of the recording paper, so that the recording can be done irrespective of the number of digits even with narrow recording paper.

The third object of the present invention is to provide a data recording system in which two or more words are recorded by a recording head at the same time, so that the recording speed is high.

According to one aspect of the invention, there is provided a data recording system which comprises displaying data output-generating means to generate data to be displayed on a display, displaying clock signal-generating means to read out the data from the displaying data output-generating means, recording clock signal-generating means to generate a clock signal in synchronism with the recording operation for recording paper, editing means to edit the data from the displaying data output-generating means so that the contents to be displayed on the display may be recorded in the feed direction of the recording paper by the actions of both the displaying clock signal and the recording clock signal, a register to store output data from the editing means, and converting means to convert output data of the register into data to be recorded by a recorder.

These and further objects and advantages of the invention will be more apparent upon reference to the following specification, claims and appended drawings.

BRIEF DESCRIPTION OF THE DRAWINGS

FIG. 1 is a drawing for explaining a prior-art recording system;

FIGS. 2A and 2B are an electric circuit diagrams of a part of a cathode-ray tube display;

FIGS. 3A, 3B and 4 are electric circuit diagrams of an embodiment of the present invention;

FIGS. 12 to 20 are time charts for explaining the operation of the embodiment.

DESCRIPTION OF THE PREFERRED EMBODIMENTS

Figure 3A:
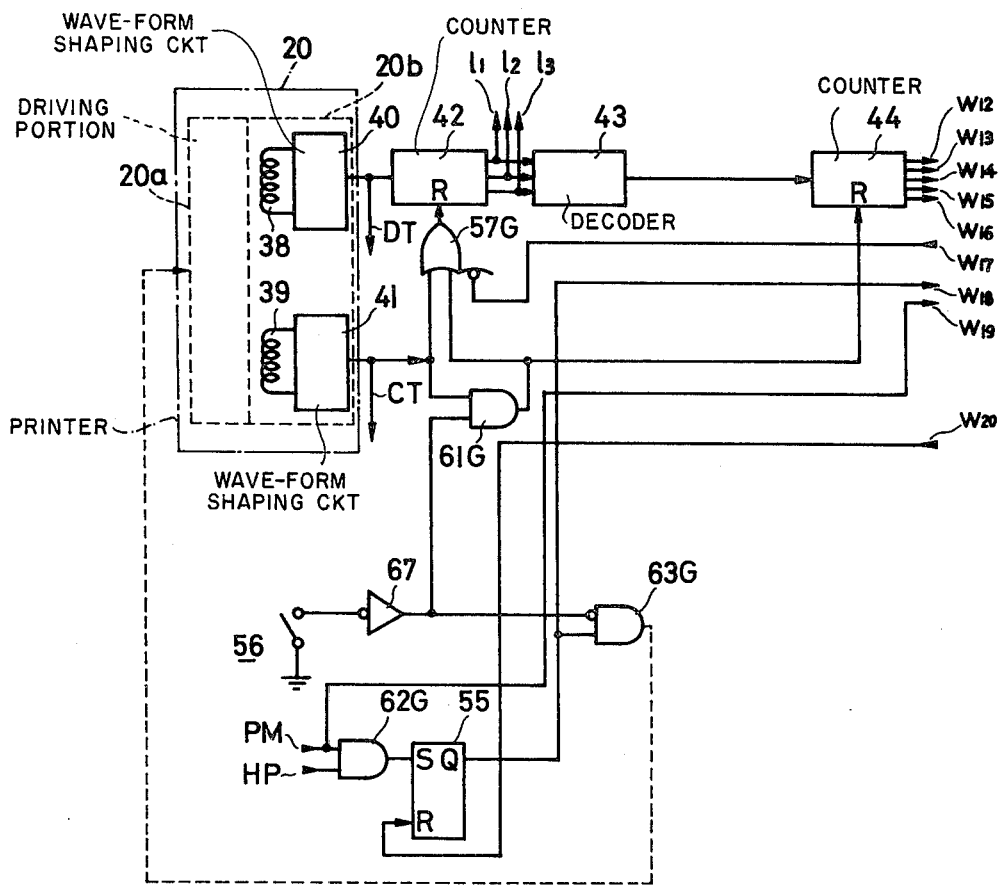

In explaining an embodiment of the present invention, it will now be outlined. The embodiment records the display contents of a cathode-ray tube display (hereinbelow termed the CRT display) which is used as the output device of an electronic computer or the like. It fetches data sequentially from the contents of the last column on a display screen, and records them orthogonally to the feed direction of a recording head. In order to especially raise the recording speed, two groups of pin electrodes are employed, and two characters are recorded at the same time. It is supposed that at the maximum, 20 words per column and 40 words per row, namely, 800 words can be displayed on the display screen of the CRT display.

The explanation will be made hereunder with reference to the drawings.

FIG. 2 is a circuit diagram of essential portions picked out from a known CRT display, and chiefly shows a section for generating signals for use in the embodiment. Referring to the figure, recording data corresponding to one row of the display screen of the CRT display are sequentially derived from the output portion 1 of a central processing unit constituting an electronic computer. The data include control data $C_1S_1$ and $C_2S_2$, and data DS of 40 words corresponding to one row as are to be displayed on the CRT display screen. A clock signal CL is generated from the electronic computer side in synchronism with the output data. A decoder 2 decodes the control data $C_1S_1$, $C_2S_2$ to generate predetermined outputs. Reference symbols $3G_1$, $3G_2 \ldots 3G_9$; $4G$; $5G$; $6G_1$, $6G_2 \ldots 6G_{20}$; and $7G_1$, $7G_2 \ldots 7G_{18}$ designate AND gates, reference symbols $8G_1$, $8G_2 \ldots 8G_9$ designate OR gates, and reference symbols $9G$ and $10G$ designate AND gates. Symbols $11G$ and $12G$ designate OR gates, and a reference numeral 13 represents an inverter. A buffer register 14 which has a storage capacity of the number of words per row of the CRT display screen, namely, 40 words, generates an output of a 1-bit from each of registers $14R_1$, $14R_2 \ldots 14R_9$ being constituent units thereof, and constructs one word of the nine parallel bits. A refresh memory 15 which stores data corresponding to one picture of the CRT display screen is composed of registers $15R_1$, $15R_2$ ... $15R_9$, and has a storage capacity of 800 bits. A timing signal generating portion 16 generates synchronizing signals at the transfer from the buffer register 14 to the refresh memory 15 and at the recording on recording paper. A counter 18 counts reference pulses which are generated from a reference pulse generator 17. The output terminals $a_1, a_2 \ldots a_{20}$ of a decoder 19 provide timing signals, which are utilized for transferring data, corresponding to one row of the CRT display screen, from the register 14 to the refresh memory 15.

The operation of the circuit in FIG. 2 will be briefly explained. When the data corresponding to one row of the CRT display screen, namely, the control data $C_1S_1$, 40 words corresponding to one row and control data $C_2S_2$ are derived from the output portion 1 of the central processing unit, then the control data $C_1S_1$ is decoded by the decoder 2, and the AND gates $3G_1$, $3G_2$ ... $3G_9$ and the AND gate 4G are opened. Accordingly, the clock signal CL passes through and AND gate 4B, and the data DS are stored into the registers $14R_1$, $14R_2$ ... $14R_9$ one by one. On the other hand, it is specified by the control data $C_1S_1$ that the stored data are display contents of the first row of the CRT screen. The specifying contents are decoded by the decoder 2, and a gate opening instruction signal is provided at the terminal 2a. Thus, the AND gate $6G_1$ is opened. Through the AND gate $6G_1$ and the OR gate 12G, the output of the terminal $a_1$ of the decoder 19 opens the AND gates $7G_2$, $7G_4$ ... $7G_{16}$, $7G_{18}$ and simultaneously closes the AND gates $7G_1$, $7G_3$ ... $7G_{15}$, $7G_{17}$.

The signal passing through the AND gate $6G_1$ and the OR gate 12G, also opens the AND gate 5G and permits the timing signal of the counter 18 to pass therethrough. Through the OR gate 11G, this signal shifts the contents of the register 14 rightwards by one digit. The shifted outputs are stored through the AND gates $7G_2$, $7G_4$ ... $7G_{16}$, $7G_{18}$ into the register 15 by the timing signal of the counter 18.

Thereafter, the stored contents in the register 14 are sequentially stored into the refresh memory 15 by the timing outputs of the counter 18. When the 40 words corresponding to one row are stored, the output level of the terminal $a_1$ of the decoder 19 is inverted to close the AND gate $6G_1$. Consequently, the output level of the OR gate 12G is inverted, to close the AND gates $7G_2$, $7G_4$ ... $7G_{16}$, $7G_{18}$ and simultaneously to open the AND gates $7G_1$, $7G_3$ ... $7G_{15}$, $7G_{17}$. The 40 words at the first row are accordingly circulated by the timing signal of the counter 18.

When recording data at the second row are subsequently supplied to the output portion 1 of the central processing unit, they are stored into the register 14 by the same operation as in the foregoing. Further, they are stored next to the data of the first row in synchronism with the timing signal from the terminal $a_2$ of the decoder 19. In this way, the data of one picture frame of the CRT display as amount to 800 words are stored into the refresh memory 15. The data stored in the refresh memory 15 are displayed on the CRT display screen sequentially from the first row to the twentieth row through the medium of, for example, a character generator (which is not explained because it is well-known means and it is not directly relevant to the embodiment). The output PM of the decoder 2 is a print instruction signal which instructs the print of the display contents of the CRT display. The input HP of the AND gate 10G is an instruction signal which indicates if the recording operation on the printer side to be described later is possible or not. For example, it prevents the recording operation from being done when the paper feed is being manually made on the printer side. The output HS of the decoder 19 is a horizontal synchronizing signal which is generated in synchronism with the scanning of each row of the CRT display screen. The output PS is a clock signal synchronous with the recording data, and is generated at every predetermined period of the horizontal synchronizing signal HS. In addition, 40 pulses are generated in one period of the horizontal synchronizing signal HS. These respective pulses indicate the columns in each row of the CRT display screen, and are generated 20 times in one picture frame. The output PR is generated at a predetermined time after the rise of the output HP, and stops after 800 pulses of the output PS are delivered.

Figure 5:
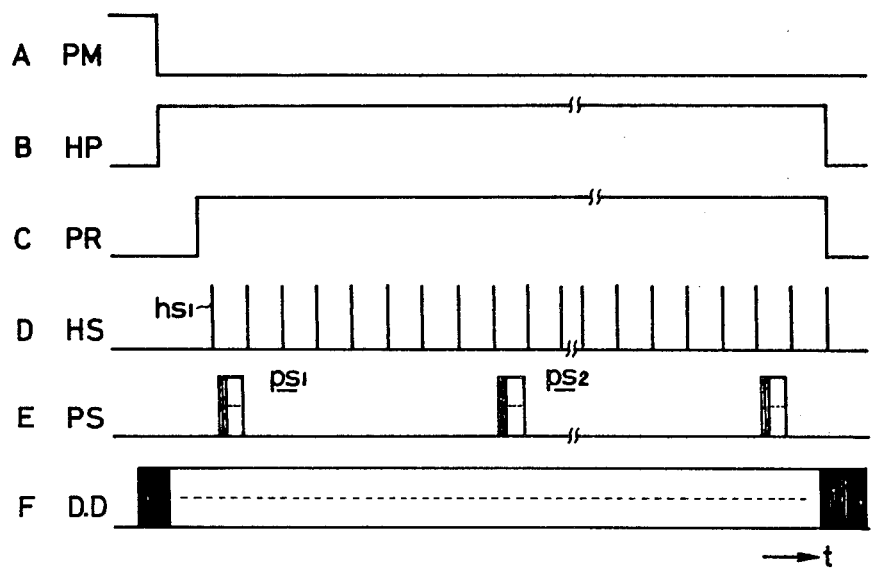
FIG. 5 is a time chart for illustrating the operation of the circuit in FIGS. 2A and 2B.

A time chart illustrating the foregoing various signals is FIG. 5. Part F in the figure illustratively shows the data which are generated from the refresh memory 15. The data are generated continually and circulatively.

The embodiment of the present invention which operates by the use of the signals stated above, will now be explained with reference to FIGS. 3 and 4.

Figure 3B:
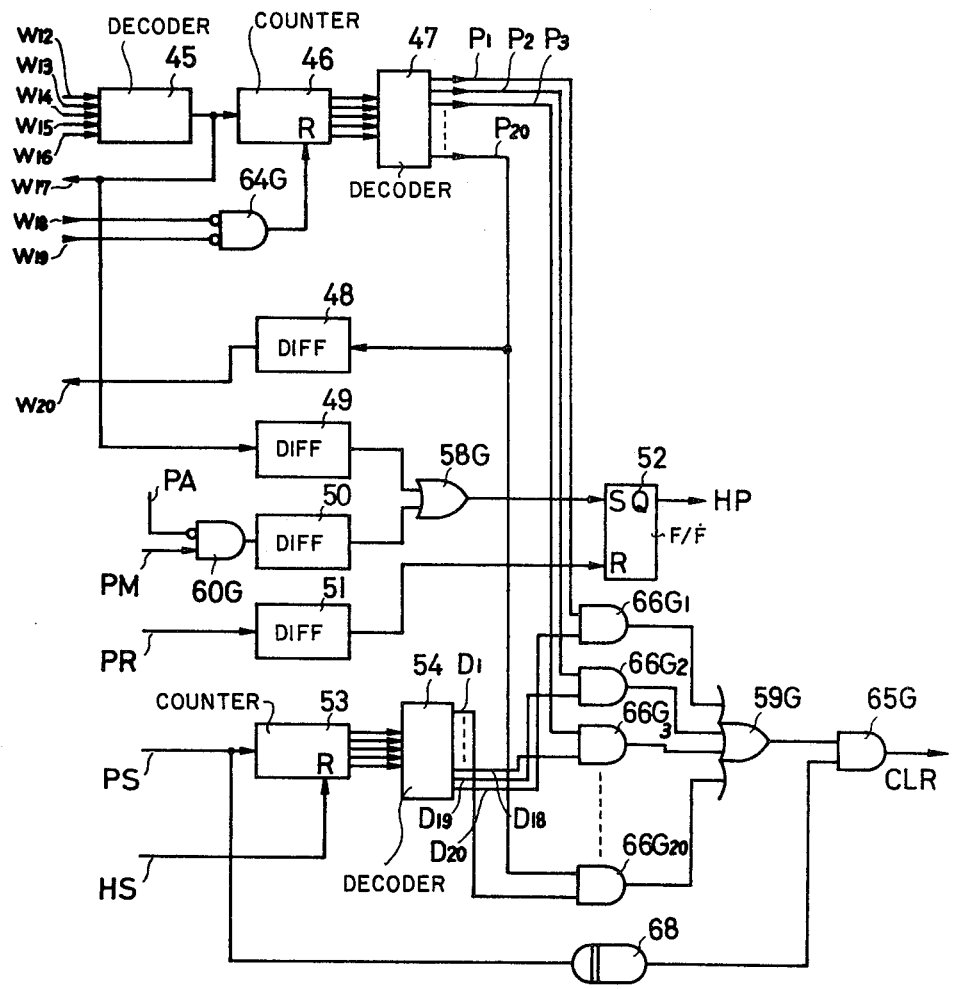
Figure 6:
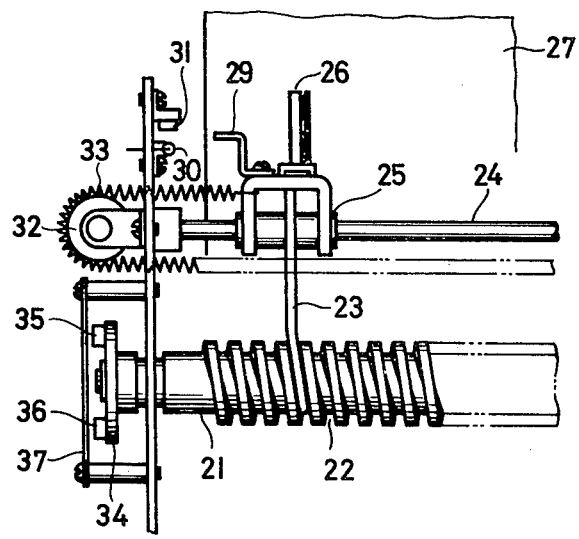
FIG. 6 is a schematic explanatory view showing the essential portions of a printer.
Figure 7:
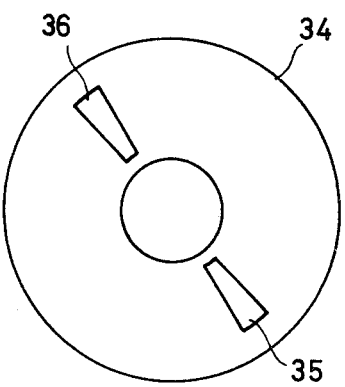
FIGS. 7 to 10 are enlarged views of parts in FIG. 6.
Figure 8:
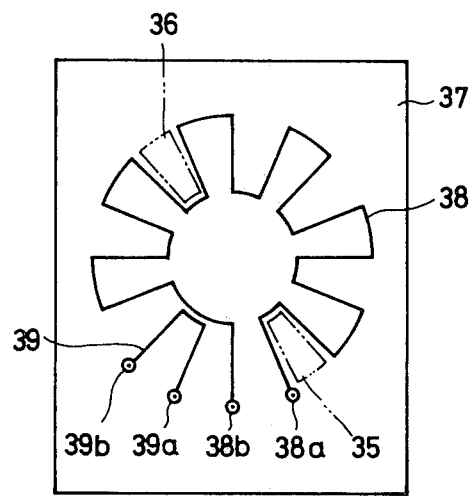

In FIG. 3, a reference numeral 20 designates the printer, which is a mechanism being conventional in the technical field concerned. A reference numeral 20a denotes the driving portion of the printer, while a reference numeral 20b a detecting portion for detecting the position of movement of a recording head. FIGS. 6 to 8 schematically show the essential portions of the printer with importance attached to an example of the detecting portion 20b.

Figure 9:
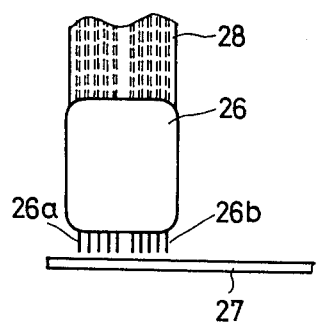
Figure 10:
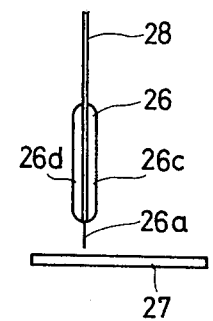

A screw shaft 21 formed with a spiral groove 22 is rotated in interlocking with a motor (not shown), to move a feed lever 23 which is engaged with the spiral groove 22 and on which the recording head 26 is mounted. At this time, a recording head base 25 slides along a guide shaft 24. Pin electrodes planted in the recording head 26 are disposed in opposition to recording paper 27. The recording head 26 is shown in enlarged scale in FIGS. 9 and 10. In the figures, pin electrode groups 26a and 26b each consisting of five electrodes are secured by being held between ceramic plates 26c and 26d. The pin electrodes are connected at one end to a flexible cable 28. In FIG. 6, a reed piece 29 is secured to the recording head base 25. When the recording head 26 has come to the start position, the reed piece 29 enters between a reed switch 30 and a magnet 31 and thus opens the reed switch 30 by the magnetic shielding. Over a pulley 32, a coiled spring 33 is extended in engagement. A rotary disc 34 is coaxially coupled to the spiral shaft 21, and has magnets 35 and 36 symmetrically secured onto its surface. An enlarged view of the rotary disc 34 is shown in FIG. 7. On the surface of a fixed plate 37 in FIG. 6, detecting coils 38 and 39 are bent and wired. This state is shown in an enlarged view in FIG. 8.

The operation will now be briefly stated. When the screw shaft 21 is rotated in interlocking with the revolution of the motor (not shown), the recording head base 25 moves rightwards as viewed in FIG. 6. Simultaneously therewith, the rotary disc 34 rotates, so that voltages are induced in the detecting coils 38, 39 by the magnets 35, 36. The positional relations between the magnets 35, 36 of the rotary disc 34 and the detecting coils 38, 39 are so set that the voltage induced across terminals 38a and 38b may be generated in synchronism with the arrival of the recording head 26 at a position for recording and that the voltage induced across terminals 39a and 39b may be generated on this side of the recording position.

Referring back to FIG. 3, wave-form shaping circuits 40, 41 perform the wave-form shaping of the voltages induced in the detecting coils 38, 39. A counter 42 counts the number of dot columns constituting a character, in case of recording one character. Since one character is recorded with 5 × 7 dots in the example, the counter indicates the respective ones of the seven columns in sequence. A decoder 43 functions to decode the number of characters to-be-recorded, and is so set as to generate one pulse each time one character is recorded. A counter 44 counts the number of characters which are recorded in one row of the recording paper 27, while a decoder 45 decodes the completion of the print of the characters corresponding to one row. A counter 46 counts the number of rows of the character which are recorded on the recording paper 27, while a decoder 47 indicates the recording rows on the recording paper 27. The outputs $P_1, P_2 \ldots P_{20}$ of the decoder 47 provide timing signals which are synchronous with the recording at the respective ones of the first to twentieth rows. A differentiator 48 differentiates the fall of the timing signal of the output $P_{20}$, a differentiator 49 differentiates the fall of the output of the counter 45, and a differentiator 50 differentiates the fall of an input signal. Further a differentiator 51 differentiates the fall of the output PR. A reference numeral 52 designates a flip-flop circuit, and a reference numeral 53 a counter of scale-of-40. The outputs $D_1, D_2 \ldots D_{20}$ of a decoder 54 provide timing signals which indicate every two display columns on the CRT display screen. A reference numeral 55 designates a flip-flop circuit. A switch 56 corresponds to the reed switch 30 in FIG. 6. Reference symbols 57G, 58G and 59G denote OR gates, while reference symbols 60G, 61G ... 65G and $66G_1, 66G_2 \ldots 66G_{20}$ denote AND gates. Shown at a reference numeral 67 is an inverter, and at a reference numeral 68 a delay element.

Referring to FIG. 4, a shift register 69 consists of registers $69R_1, 69R_2 \ldots 69R_9$, and stores the outputs $d_1, d_2 \ldots d_9$ of the refresh memory 15 in FIG. 2. Reference numerals 70 and 71 designate latch circuits each having storage capacity of nine bits. Reference symbols $72G_1, \ldots 72G_9$ and $73G_1 \ldots 73G_9$ denote AND gates, while reference symbols $74G_1 \ldots 74G_9$ denote OR gates. A character generator 75 is constructed of a memory 75a such as read only memory (ROM), a character address decoder 75b, a counter and decoder 75c, and a select switch 75d for indicating dot columns. A program of dot forming patterns of characters, numerals etc. corresponding to the output the bit patterns from the shift register 69 is previously stored in the memory 75a. Reference numerals 76 and 77 designate latch circuits each having storage capacity of five bits, while reference symbols $78G_1 \ldots 78G_5$ and $79G_1 \ldots 79G_5$ denote AND gates. Driving circuits 80 — 80 and 81 — 81 drive the groups of pin electrodes 26a and 26b, respectively. In shift registers 82 and 83, the respective outputs of the constituent flip-flop circuits (not shown) are taken out to terminals A, B, C, D and A, B, C, D, E. A reference numeral 84 denotes a clock signal generator, and at a reference numeral 85 a one-shot multivibrator. A reference symbol 86G designates an OR gate, while reference symbols 87G, 88G ... 91G denote AND gates. Reference numerals 92 and 93 designate delay elements.

Description will now be made of the operation in which, among the data stored in the refresh memory 15, those to be displayed at the first row of the CRT display screen are transferred to the register 69 in FIG. 5. First of all, there will be explained a clock signal CLR for tranferring the data.

Figure 12:
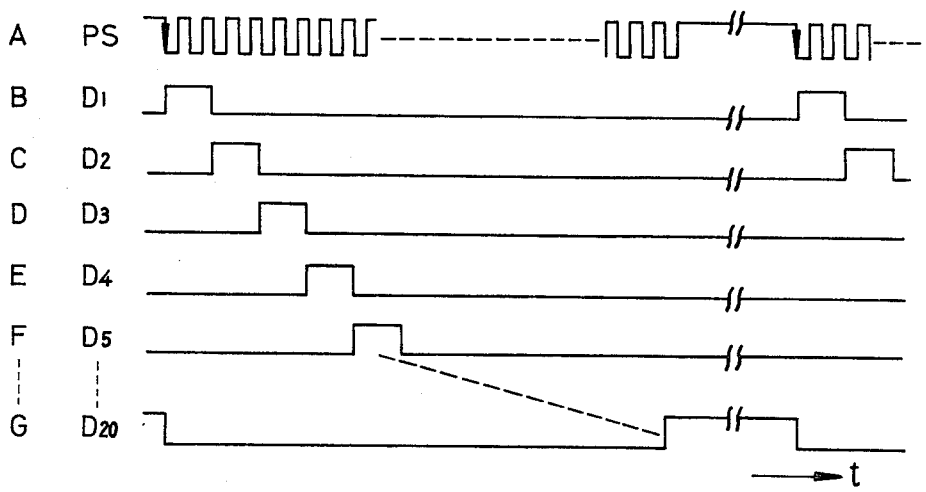

In FIG. 2, the data outputs of one picture frame of the CRT display screen are generated from the output portion 1 of the central processing unit, and thereafter the print instruction PM is generated. At part A in FIG. 5, this means that the output which is usually at the high level is inverted to the low level. Accordingly, one input of the AND gate 60G in FIG. 3 is held at the low level. In the AND gate 60G, the level of the input PA is low or high in dependence on whether the printer side is ready for recording or not. In such case where the paper feed is manually done on the printer side, the level outputs are generated in correspondence with the on-and-off operations of switch to permit the paper feed. At the feed operation, the input PA becomes the high level, and the gate is closed. It is now assumed that the printer side is in the state ready for recording, and that the output PA is at the low level. Since, under this condition, the fall of the output PM inverts the output of the AND gate 60G to the low level, it is differentiated by the differentiator 50 and sets the flip-flop circuit 52. Consequently, the output HP is inverted to the high level as at the part B in FIG. 5, and opens the AND gate 10G in FIG. 2. The output of the high level as shown at the part C in FIG. 5 is held at the terminal $b_0$ of the decoder 19 during the period of scanning in the row direction for one picture frame of the CRT display screen, so that the output PR is generated at the output of the AND gate 10G. The AND gate 9G is therefore opened. The group of 40 pulses are generated at the output $b_1$ of the decoder 19 at every predetermined period of the horizontal synchronizing signal HS, so that the output PS shown at the part E in FIG. 5 is generated at the output of the AND gate 9G. When an indicating pulse train $PS_1$ for the respective columns of the first row of the CRT display screen is supplied to the counter 53, the decoder 54 generates the timing outputs $D_1, D_2 \ldots D_{20}$ at the parts A to G in FIG. 12. The timing outputs $D_1, D_2 \ldots D_{20}$ perform the indication at every two columns of the CRT display screen. For example, during the period during which the pulse $D_1$ is generated, the display contents at the first and second columns of the display screen are read out from the refresh memory 15 and are displayed. In consequence, when the pulses $D_1$ are generated by 20, all the display contents at the 39-th and 40-th columns are read out from the refresh memory 15. Only the output $D_{20}$ keeps its level until, after the fall of the timing pulse of the output $D_{19}$, a pulse train $PS_2$ is subsequently fed.

Next, the descrption will be made of the timing signals $P_1, P_2 \ldots P_{20}$ which are supplied from the decoder 47 to the AND gates $66G_1, 66G_2 \ldots 66G_{20}$. It is now supposed that the recording head base 25 in FIG. 6 is set at the start position at the left end part. Since the reed piece 29 intervenes between the reed switch 30 and the magnet 31, the switch 56 in FIG. 3 is open, and the AND gate 63G is open. When the foregoing outputs PM and HP at the parts A and B in FIG. 5 are supplied, the flip-flop circuit 55 is set, and its output is inverted into the high level. The inverted level is produced in the AND gate 63G, and the driving portion 20a of the printer is actuated. Consequently, the screw shaft 21 is rotated, to move the recording head base 25 rightwards in FIG. 6. Upon the rotation of the screw shaft 21, the rotary disc 34 is rotated, and the induced voltages appear in the coils 38, 39. The A.C. voltages are shaped by the wave-form shaping circuits 40, 41 in FIG. 3, and become the pulse trains DT, CT at the parts A and B in FIG. 13, respectively. When the pulse CT is first generated, the counter 42 is reset through the OR gates 57G. The pulses DT thereafter generated are counted by the counter 42. The count outputs $l_1, l_2, l_3$ are used as read-out order indicating signals of the program of the character generator 84 to be described in detail later. The outputs $l_1, l_2, l_3$ are counted through the decoder 43 and by the counter 44 as at the part C in FIG. 13. When the words to be recorded on the recording paper and corresponding to one row, namely, 20 words are counted, the output level of the decoder 45 is inverted. The inverted levels are counted by the counter 46. Thus, the timing signals indicating the rows at which the recording is being done on the recording paper are generated at the outputs $P_1, P_2 \ldots P_{20}$ of the decoder 47 as shown at the part B to the part E in FIG. 14. The pulse $P_1$ at the part B in FIG. 14 is generated in synchronism with the period in which the recording head is scanning the first row on the recording paper, the pulse $P_2$ at the part C in FIG. 14 is generated in synchronism with the period in which it is scanning the second row, and the pulse $P_{20}$ at the part E in FIG. 14 is generated in synchronism with the period in which it is scanning the last row or 20-th row. Here, it is to be borne in mind that since two characters are simultaneously recorded by the two groups of pin electrodes in the embodiment, the characters are formed over two rows in each column. To the inputs of the AND gates $66G_1, 66G_2 \ldots 66G_{20}$, there are supplied the timing signals $D_1, D_2 \ldots D_{20}$ and the timing signals $P_1, P_2 \ldots P_{20}$ as stated previously. The timing relations between the timing signals $D_1, D_2 \ldots D_{20}$ and those $P_1, P_2 \ldots P_{20}$ are as follows.

Now, let's take the timing pulse $P_1$ as an example. In the period of the generation of the pulse $P_1$, the respective timing pulses $D_1, D_2 \ldots D_{20}$ are generated 20 times. As to the CRT display screen, it is indicated 20 times in every two columns. At each time, the display contents of each row are read out from the refresh memory and are displayed. Accordingly, the pulses $D_{20}$ are generated from the AND gate $66G_1$ by 20 in the period. Therefore, while the timing pulse $P_1$ is kept supplied to the AND gate $66G_1$, the pulses $P_1, D_{20}$ at the part B in FIG. 15 are generated by 20 at the output of the AND gate $66G_1$. When the AND gate 65G is opened by the first pulses $P_1, D_{20}$, pulses $f_1, f_2$ at the part F in FIG. 15 among the outputs PS slightly delayed by the delay element 68 pass therethrough. The pulses $f_1, f_2$ are respectively the 39-th, 40-th pulses, and constitute the clock signal CLR for writing the output of the refresh memory 15 into the register 69. The pulses $f_1, f_2$ are synchronous with the read-out of the 39-th word and the 40-th word among 40 words of the stored data from the refresh memory 15, so that the 39-th word is written into the register 69 by the pulse $f_1$ and that the 40-th word is written into the register 69 by the pulse $f_2$.

Figure 17:
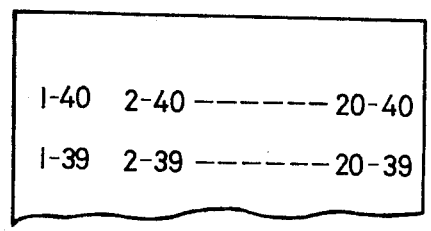

The reason why the data are written into the register 69 by the clock signal CLR as stated above, is that the sequence of the display on the CRT display screen and the printing sequence in the present invention differ. FIG. 16 illustrates the positions of words to be displayed on the CRT display screen. As is well known, the outputs of the refresh memory 15 are sequentially displayed on the CRT display screen under the scanning of the positions 1-1, 1-2 ... 1-39, 1-40 in the order mentioned. Upon completion of one row, each of the contents of the positions 2-1, 2-2 ... 2-40 is displayed in the order mentioned. In the embodiment, however, every two contents of positions $$\left(\frac{1-40}{1-39}\right), \left(\frac{2-40}{2-39}\right), \left(\frac{3-40}{3-39}\right) \ldots \left(\frac{20-40}{20-39}\right)$$

are recorded on the recording paper concurrently and in the order mentioned by means of the two groups of pin electrodes 26a and 26b as is illustrated in FIG. 17.

Figure 18:
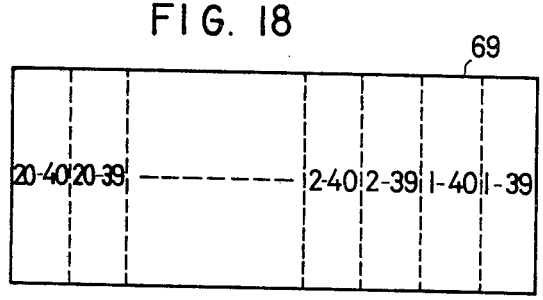

In the course in which the recording contents of the positions 1-1, 1-2 ... are provided from the refresh memory 15 in FIG. 2, when the contents of the position 1-39 are derived it is written into the register 69 by the pulse $f_1$ of the output CLR at the part F in FIG. 15, and when the contents of the position 1-40 are generated they are written into the register 69 by the pulse $f_2$. Thereafter, the contents of the position 2-39, 2-40 are sequentially written into the register 69 by pulses $f_3, f_4$. When the data corresponding to one row of the CRT display screen are written into the register 69 in this way, the stored positions of the respective contents are as shown in FIG. 18. When the data corresponding to one row are thus written into the register 69, the output PR halts as shown at the part C in FIG. 5.

The above-stated transfer of one row of data is executed before the reed piece 29 in FIG. 6 comes out from between the reed switch 30 and the magnet 31. When the reed piece 29 comes away from the reed switch 30 and the switch 56 (FIG. 3) is closed, the output level of the AND gate 63G is inverted and the instruction signal to the driving portion 20a is halted. However, the spiral shaft 21 sustains the rotation, and the recording head base 25 continues the movement.

Description will now be made of the operation of recording the data of the register 69. In the register 69, the data are stored as shown in FIG. 18. Let it now be supposed that the contents of the position 1-39 are the bit pattern corresponding to the dot character to be formed by the group of pin electrodes 26b in FIG. 11, while the contents of the position 1-40 are the bit pattern corresponding to the dot character to be formed by the group of pin electrodes 26a. It is also supposed that the bit pattern of the position 1-40 indicates the contents of character "Z" at a position S in FIG. 11, and that the bit pattern of the position 1-39 indicates the contents of character "Y" at a position R.

Figure 13:
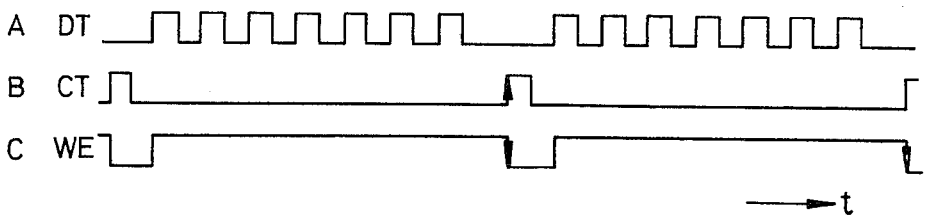
Figure 14:
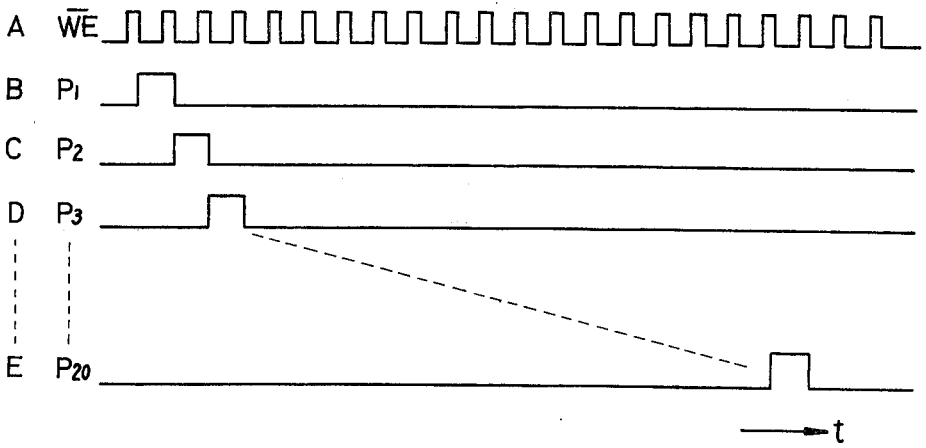
Figure 19:
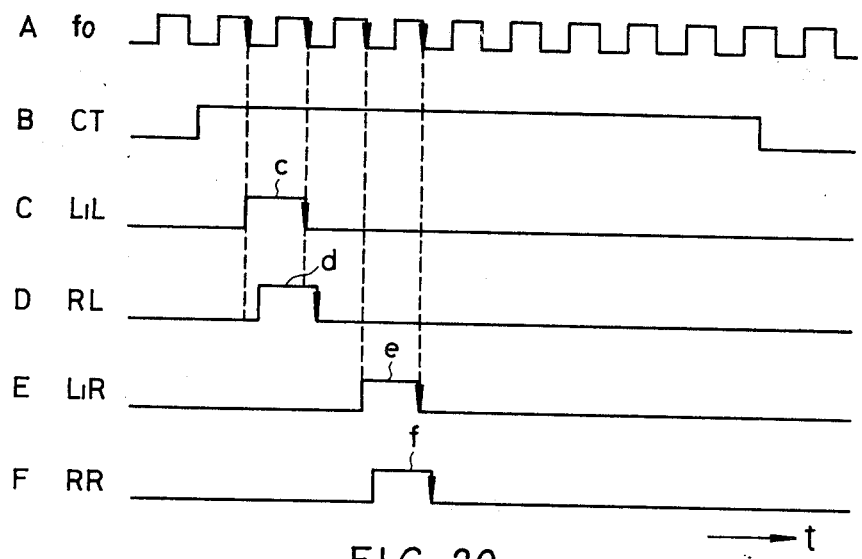

When, after the data in the refresh memory 15 as correspond to one row have been transferred to the register 69, the pulse CT shown at the part B in FIG. 19 (in which the time scale in FIG. 13 is expanded) is derived, a pulse C at the part C in FIG. 19 is arised at the putput of the AND gate 87G through the shift register 82 on the bases of clock pulses $f_0$ at the part A in FIG. 19 as supplied from the pulse generator 84. The latch circuit 71 is opened by the fall of the pulse c, so that the bit pattern of the position 1-39 of the register 69 is transferred.

The pulse C is slightly delayed by the delay element 92 as shown by a pulse $d$ at the part D in FIG. 19, and the delayed pulse shifts the storing contents of the register 69 rightwards by one digit through the OR gate 86G. Accordingly, the bit pattern of the position 1-40 is stored at the storage position at the right extreme end of the register 69. Subsequently, the latch circuit 70 is opened by the fall of a pulse $e$ at the part E in FIG. 19 as is the output of the AND gate 88G. The bit pattern of the position 1-40 is accordingly transferred. The pulse $e$ is slightly delayed by the delay element 93, and becomes a pulse $f$ at the part F in FIG. 19. Through the OR gate 86G the pulse $f$ shifts the storing contents of the register 69 rightwards by one digit, so that the bit pattern of the position 2-39 is stored at the storage position at the right extreme end.

Figure 11:
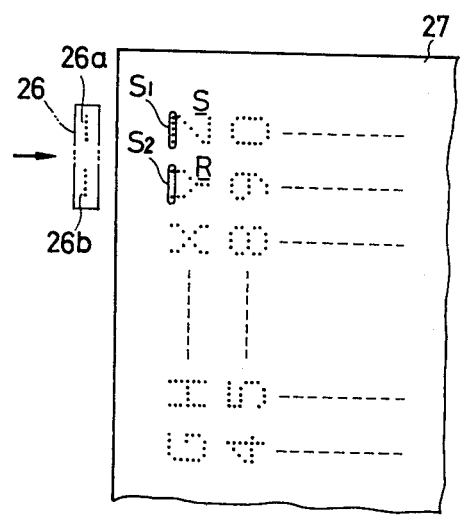
FIG. 11 is a drawing for explaining the recording system of the embodiment.
Figure 20:
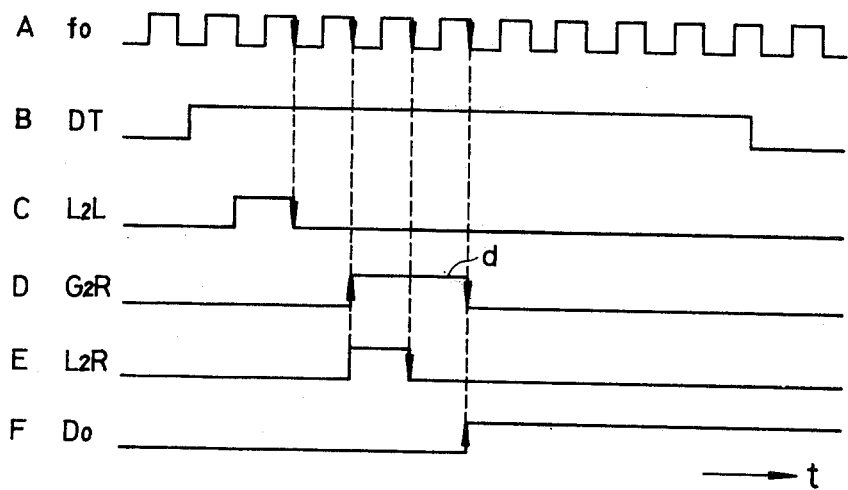

Here, a pulse $d$ at the part D in FIG. 20 is applied from the AND gate 90G to the inhibit input of each of the AND gates $73G_1$, $73G_2$ .... $73G_9$. Without the pulse $d$ at the part D in FIG. 20, the AND gates $73G_1$, $73G_2$ ... $73G_9$ are kept open, and the stored data in the latch circuit 71, namely, the bit pattern of the position 1-39 is supplied to the input of the character generator 75. As previously stated, the memory 75a in the character generator 75 is programmed so that the character patterns may be recorded at the positions as shown in FIG. 11. To the counter and decoder 75c, there are supplied the outputs $l_1$, $l_2$, $l_3$ of the counter 42 in FIG. 3. When the first recording instruction pulse DT at the part B in FIG. 20 is derived, "1" is counted by the counter 42. Consequently, the counter and decoder 75c indicates the first dot output of the input pattern, that is, the dot output of the first column $S_2$ in FIG. 11.

When a pulse at the part C in FIG. 20 is derived from the AND gate 91G, the latch circuit 77 is opened by the fall thereof, and the above-mentioned dot output is stored.

When the pulse $d$ at the part D in FIG. 20 is derived from the AND gate 90G, the AND gates $73G_1$, $73G_2$ . . . $73G_9$ fall into the inhibited state and are disenabled. In contrast, the AND gates $72G_1$, $72G_2$ . . . $72G_9$ are opened and the stored data in the latch circuit 70, namely, the bit pattern of the position 1-40 is supplied to the input of the character generator 75. Consequently, quite similarly to the foregoing case of the bit pattern of the position 1-39, the dot pattern $S_1$ of the first column is selected to produce the output. By the fall of a pulse at the part E in FIG. 20 as is derived from the AND gate 89G, the latch circuit 76 is opened, so that the dot pattern of the first column is stored. Subsequently, the one-shot multivibrator 85 is triggered by the fall of the pulse $d$ at the part D in FIG. 20, and it arises a pulse at the part F in FIG. 20. The AND gates $78G_1$, $78G_2$ . . . $78G_5$ and the AND gates $79G_1$, $79G_2$ . . . $79G_5$ are opened by this pulse. Then, the dot output of the first column of the bit pattern of the position 1-40 in the latch circuit 76 drives the pin electrodes 26a selectively through the driving circuits 80, . . . 80. Simultaneously therewith, the dot output of the first column of the bit pattern of the position 1-39 in the latch circuit 77 drives the pin electrodes 26b selectively through the driving circuits 81, . . . 81. As a result, the dots $S_1$ of the first column of the character Z in FIG. 11 are electrosensitively recorded by the group of pin electrodes 26a, while the dots $S_2$ of the first column of the character Y are electrosensitively recorded by the group of pin electrodes 26b. When the recording head 26 is further moved and the next recording instruction pulse DT is arised, those of the second column among the respective inputs of the character generator 75 corresponding to the positions 1-39, 1-40 are indicated by the counter and decoder 75c in FIG. 3. Quite likewise to the foregoing case, the dots of the second column of the respective characters Z, Y in FIG. 11 are recorded. When the recording is thus made and the recording instruction pulses DT are generated by seven in all, the recording of the characters Z, Y in FIG. 11 is completed.

Thereafter, upon generation of the recording preparation-instruction pulse CT, the operation proceeds as above stated in such manner that the next recording data of the register 69, namely, the bit patterns of the positions 2-39 and 2-40 are transferred to the latch circuits 70 and 71, respectively, and that character patterns which are "9" and "0" in case of FIG. 11 are recorded by the next seven recording instruction pulses DT.

When the recording of the 20 words corresponding to one row is completed in this way, the fall of the pulse derived from the decoder 45 sets the flip-flop circuit 52 through the differentiator 49 and inverts the output HP. On the other hand, the recording head 26 is returned to the start position, and simultaneously the recording paper is fed for a new row. A feed mechanism etc. in the feeding operation are means being conventional in I/O devices, and any feature of the present invention does not lie in such mechanism. Therefore, no detailed explanation is made here. When the recording head 26 returns to the start position, the switch 56 in FIG. 3 turns "on." Data of the second row are transfered from the refresh memory 15 into the register 69, and the recording is carried out quite likewise to the previous case. When all the contents of the CRT display screen are recorded, the fall of the output $P_{20}$ of the decoder in FIG. 3 resets the flip-flop circuit 55 through the differentiator 48.

Although, in the embodiment, the recording is made with the two groups of pin electrodes, it is needless to say that only one group or at least three groups may also be employed. In this case, however, it is necessary to adjust the number of pulses of the timing pulses $P_1$, $P_2$ . . . ; $D_1$, $D_2$ . . . . For example, in the case of employing one group of pin electrodes, the timing signals from the decoders 47, 54 need be generated by 40.

The printing system is not restricted to the electrosensitive recording, but is may also be the electrostatic recording, the thermoelectric recording, the dot recording with a wire printer, and so forth.

While the embodiment records the display contents of the CRT display, the invention is not restricted thereto but it is applicable to any case where data outputs for recording are generated.

As thus far described, the present invention records characters, numerals, symbols etc. in the feed direction of recording paper under the condition that the sequence of data outputs to be generated in a predetermined sequence is changed. For this reason, even when the recording paper has a small width, the recording can be performed irrespective of the magnitude of the number of digits.

In case of recording, for example, the display contents of the CRT display, it has hitherto been necessary to employ an optical system. In contrast, according to the present invention, circuits for arranging data in the recording sequence are comparatively simple, and all of them can be formed into integrated circuits, so that a very small apparatus suffices. The order of recording data outputs can be arbitrarily set by merely modifying some of the circuits, so that any recording system is possible.

Where two or more words are recorded by a recording head at the same time, the recording speed can be raised.

What we claim is:

1. Apparatus for recording characters so as to enable reading thereof in a feed direction of a recording sheet comprising: refresh memory means for storing data on one picture frame to be displayed on a display screen; first storage means for storing the data derived from said refresh memory; dot-forming means for forming patterns of discrete dots on a recording sheet orthogonally to a feed direction of the recording sheet; character-generating means for converting input data thereof into dot-forming data for selectively driving said dot-forming means such that characters developed by said dot-forming means according to the dot-forming data are recorded so as to enable reading thereof in a feed direction of said recording sheet; second storage means for storing the above-mentioned converted dot-forming data derived from said character-generating means, selecting means for selecting patterns of discrete dots formed by said dot-forming means according to the dot-forming data derived from said second storage means and according to characters to be displayed on the picture frame and recorded on said recording sheet so as to enable reading thereof in a feed direction of said recording sheet, said first storage means comprising two kinds of storage means comprising one storage means for data derived from said refresh memory and corresponding to each row from among data to be displayed on one picture frame and another storage means for storing data derived from the stored data in said one storage means and corresponding to each column from among data to be displayed on the one picture frame.

2. Apparatus for recording characters so as to enable reading thereof in a feed direction of a recording sheet according to claim 1, further including a plurality of register means for storing each of data bits corresponding to different characters derived from said another storage means and for providing the data bits derived therefrom to said character-generating means; said dot-forming means comprising means for forming simultaneously each of dot-forming data of different kinds of characters; and said second storage means comprises a plurality of register means for storing the above-mentioned different dot-forming data, thereby a plurality of characters developed by said dot-forming means according to each of dot-forming data derived from said storage means and selectable simultaneously by said selecting means and recorded simultaneously on said recording sheet.

* * * * *